United States Patent
Kracht et al.

(10) Patent No.: US 10,196,133 B2
(45) Date of Patent: Feb. 5, 2019

(54) METHOD FOR ACCELERATED POWERED SELF PUSH BACK OF AN AIRCRAFT

(71) Applicant: Borealis Technical Limited, North Plains, OR (US)

(72) Inventors: Stefan Kracht, Pullach (DE); Jan Vana, Prague (CZ); Joseph J. Cox, Portland, OR (US); Isaiah W. Cox, London (GB)

(73) Assignee: Borealis Technical Limited, Gibraltar (GI)

( * ) Notice: Subject to any disclaimer, the term of this patent is extended or adjusted under 35 U.S.C. 154(b) by 107 days.

(21) Appl. No.: 14/337,229

(22) Filed: Jul. 22, 2014

(65) Prior Publication Data

US 2015/0021431 A1 Jan. 22, 2015
US 2015/0175256 A2 Jun. 25, 2015

Related U.S. Application Data

(60) Provisional application No. 61/857,213, filed on Jul. 22, 2013.

(51) Int. Cl.
*B64C 25/40* (2006.01)
*B64F 1/00* (2006.01)
(Continued)

(52) U.S. Cl.
CPC ............ *B64C 25/405* (2013.01); *B64D 27/00* (2013.01); *B64D 45/00* (2013.01); *B64F 1/00* (2013.01); *B64F 1/36* (2013.01); *Y02T 50/823* (2013.01)

(58) Field of Classification Search
CPC .. B64C 25/405; B64F 1/36; B64F 1/00; B64F 1/305; B64F 1/31; B64F 1/338; B64D 45/00; B64D 27/00; G08G 5/065
(Continued)

(56) References Cited

U.S. PATENT DOCUMENTS 2,875,457 A * 3/1959 Read .................... B64F 1/3055
                                                    104/20
3,807,664 A * 4/1974 Kelly, Jr. .............. B64C 25/405
                                                    180/302
(Continued)

FOREIGN PATENT DOCUMENTS

GB        2457144 A       8/2009
WO     2012109380 A2     8/2012

OTHER PUBLICATIONS

Federal Aviation Administration (FAA), Advisory Circular AC 150/5360-13, Federal Aviation Administration (FAA), 4/88, Chapter 4, "Terminal Apron Areas", pp. 29-52.*
(Continued)

*Primary Examiner* — Medhat Badawi
*Assistant Examiner* — Vicente Rodriguez

(57) ABSTRACT

A method for accelerated power push back of an aircraft equipped with a pilot-controlled engines-off taxi system that drives the aircraft without reliance on the aircraft's main engines or tugs is provided. An aircraft is quickly and efficiently moved out of a gate where it is positioned in a nose-in orientation. The pilot controls the taxi system to drive the aircraft in reverse along a perpendicular path away from the terminal to a location where there is sufficient space for the aircraft to stop and turn, and the aircraft is turned and driven in a forward direction to a takeoff runway. Pilot reliance on ground personnel guidance during push back maneuvers is minimized by providing a monitoring system designed to monitor gate and ramp areas around the aircraft in any visibility or environmental conditions and provide feedback to the pilot.

8 Claims, 3 Drawing Sheets

(51) Int. Cl.
B64D 27/00 (2006.01)
B64D 45/00 (2006.01)
B64F 1/36 (2017.01)

(58) Field of Classification Search
USPC .......................................................... 244/50
See application file for complete search history.

(56) References Cited

U.S. PATENT DOCUMENTS

| | | | | |
|---|---|---|---|---|
| 3,916,588 | A * | 11/1975 | Magill | B64F 1/00 |
| | | | | 104/27 |
| 5,513,821 | A * | 5/1996 | Ralph | B64C 25/50 |
| | | | | 180/423 |
| 6,118,401 | A * | 9/2000 | Tognazzini | G01S 7/04 |
| | | | | 342/29 |
| 6,305,484 | B1 * | 10/2001 | Leblanc | B60T 7/16 |
| | | | | 180/167 |
| 6,657,334 | B1 | 12/2003 | Edelson | |
| 6,838,791 | B2 | 1/2005 | Edelson | |
| 6,914,542 | B2 * | 7/2005 | Hutton | B64F 1/00 |
| | | | | 244/114 R |
| 6,929,217 | B2 * | 8/2005 | Greaves | B64F 1/00 |
| | | | | 14/71.5 |
| 7,116,019 | B2 | 10/2006 | Edelson | |
| 7,445,178 | B2 * | 11/2008 | McCoskey | B64F 1/32 |
| | | | | 244/100 R |
| 7,469,858 | B2 | 12/2008 | Edelson | |
| 7,891,609 | B2 | 2/2011 | Cox | |
| 7,975,960 | B2 | 7/2011 | Cox | |
| 8,109,463 | B2 | 2/2012 | Cox | |
| 8,485,466 | B2 * | 7/2013 | Charles | B64C 25/405 |
| | | | | 244/103 R |
| 8,620,493 | B2 * | 12/2013 | Hughes | G05D 1/0202 |
| | | | | 244/76 R |
| 9,091,762 | B2 * | 7/2015 | Knight | G01S 13/93 |
| 2004/0208603 | A1 * | 10/2004 | Hekkel | H04B 10/1125 |
| | | | | 398/140 |

OTHER PUBLICATIONS

Airports Council International (ACI), Apron Markings and Signs handbook, Airports Council International (ACI), Nov. 2006.*

* cited by examiner

METHOD FOR ACCELERATED POWERED SELF PUSH BACK OF AN AIRCRAFT

PRIORITY CLAIM

This application claims priority from U.S. Provisional Patent Application No. 61/857,213, filed 22 Jul. 2013, the disclosure of which is fully incorporated herein by reference.

TECHNICAL FIELD

The present invention relates generally to a method for moving a parked aircraft on the ground without operation of the aircraft's main engines or tow vehicles and specifically to a method for powered self push back of an aircraft that quickly and autonomously moves an aircraft in reverse and turns the aircraft for travel to a takeoff runway.

BACKGROUND OF THE INVENTION

Most airports, especially large airports, currently simultaneously handle large numbers of arriving and departing aircraft of different sizes and body types. The successful management of a large volume of aircraft ground traffic requires careful control of all aircraft ground movement, particularly the movement of departing aircraft. Aircraft parked at a gate or parking area in an airport prior to departure are typically positioned in a perpendicular orientation with the nose of the aircraft facing the gate or airport terminal. Upon departure, the aircraft must move in reverse and make one or more turns before reaching a taxiway prior to taxi and takeoff. Arriving aircraft are moving in a forward direction and turning as required to travel from the runway to a gate or parking location as the departing aircraft are leaving. Departing aircraft must be maneuvered carefully in a reverse direction in an airport ramp area to avoid not only incoming aircraft traveling toward the gates, but also baggage carriers, tugs, and other airport ground vehicles on the trip between the gate and the taxiway.

At the present time, aircraft leaving a gate or other parking location near an airport terminal are pushed in a reverse direction by a tow vehicle or tug that temporarily connects to the aircraft nose landing gear. Once attached to the aircraft, the tug pushes the aircraft in the reverse direction for a distance required to clear the gate to a location where the aircraft is oriented parallel to the terminal and the main engines can be turned on to move the aircraft in a forward direction. The tug is then detached from the aircraft and moved away, and the aircraft is ready to taxi to a runway for takeoff. The movement of tugs and tow vehicles contributes to ground vehicle traffic. Tugs, in addition, must be monitored to keep track of their locations so they may be moved to the next location by the time a tug is needed to push back a departing aircraft. Many aircraft departure delays are the direct result of tug unavailability. This process is time-consuming and may significantly increase the time an aircraft spends on the ground.

Aircraft can also be moved in reverse from a parked position by starting the aircraft's main engines and reversing them to drive the aircraft in a reverse direction. This process, known as reverse thrust, is problematic when used by jet engines and can be dangerous. An aircraft engine operating in reverse thrust may pull foreign object debris (FOD) from the aircraft's environment into the engine and throw it forward, usually in the direction of the gate or airport terminal. The potential for injury to ground personnel, ground vehicles, and airport structures from FOD and also from jet blast from an operating engine can be significant. The use of reverse thrust is prohibited for jet engines and is permitted for use only by turboprop aircraft. Dependence on the use of a departing aircraft's main engines is neither a safe nor an efficient push back procedure.

Airport ground crew are typically assigned to attach and detach tow vehicles and to monitor and direct reversing aircraft to ensure that no part of an aircraft structure will impact any fixed object or other aircraft or vehicle and to communicate with the pilot or another aircraft cockpit crew member. The efficiency and speed with which push back can be conducted depends on the availability of ground personnel as well as the availability of tow vehicles.

The efficiency and speed of aircraft push back operations may be adversely affected by the ground congestion found in most large airports. Multiple airlines conduct both push back and landing operations for multiple aircraft virtually simultaneously. This strains not only the available towing equipment, but also the available ground personnel. Aircraft turnaround times may be increased significantly when tow bars, adapters, tugs, or ground crews are not available for push back when needed. Neither the airline nor the flight crew currently has any control over this situation.

Driving an aircraft on the ground during taxi without reliance on operation of the aircraft's main engines or the use of tow vehicles has been proposed. For example, in commonly owned U.S. Pat. No. 7,469,858 to Edelson; U.S. Pat. No. 7,891,609 to Cox; U.S. Pat. No. 7,975,960 to Cox; U.S. Pat. No. 8,109,463 to Cox et al; and British Patent No. 2457144, aircraft drive systems that use electric drive motors to power aircraft wheels and move an aircraft on the ground without reliance on aircraft main engines or tow vehicles are described. A powered self push back method and system in which aircraft equipped with such drive systems is described in commonly owned International Patent Application Publication No. WO2012109380 A2. This powered self push back method is designed for moving an aircraft parked in a nose-in orientation along a reverse path while turning the aircraft, in the same direction and along the same path as the aircraft would be pushed back with a tug. It is not suggested that an aircraft could travel in reverse along a different path and turn in a different location where the aircraft may taxi forward. Further, it is not suggested that an aircraft could be reversed from a different parking location or orientation other than a nose-in position.

A need exists for a method for powered push back of an aircraft capable of moving independently without reliance on operation of its main engines or tow vehicles that is designed to streamline and accelerate the push back process and reduce aircraft time on the ground.

BRIEF DESCRIPTION OF THE INVENTION

It is a primary object of the present invention, therefore, to provide a method for powered push back of an aircraft capable of moving independently without reliance on operation of its main engines or tow vehicles that is designed to streamline and accelerate the push back process and reduce aircraft time on the ground.

It is another object of the present invention to provide a method for accelerated power push back of an aircraft wherein an aircraft is driven by a pilot-controlled engines-off taxi system that limits pilot reliance on wing walkers and other ground personnel during pushback.

It is an additional object of the present invention to provide a method for accelerated power push back of an aircraft with an engines-off taxi system, wherein aircraft turning maneuvers are conducted at a distance from a terminal where there is minimal ramp ground traffic.

It is an additional object of the present invention to provide a method for accelerated power push back of an aircraft with an engines-off taxi system parked in a non-perpendicular orientation to an airport terminal at a gate that reduces the time required for push back and, therefore, reduces aircraft turnaround time.

It is a further object of the present invention to provide a method for accelerated power push back of an aircraft with an engines-off taxi system that minimizes the total distance driven by the aircraft between arrival at and departure from a gate.

It is yet an additional object of the present invention to provide a method for accelerated power push back of an aircraft with an engines-off taxi system parked in a non-perpendicular orientation at an airport gate, wherein the aircraft is positioned at an angle with respect to the gate that permits one or more passenger loading bridges to be easily connected with aircraft doors rear of an aircraft wing without extending over the wing.

It is a still further object of the present invention to provide a method for accelerated power push back of an aircraft equipped with an engines-off taxi system, wherein an aircraft is equipped with a system for monitoring the aircraft's environment when a pilot is driving the aircraft in reverse during pushback and providing feedback to the pilot to ensure that the aircraft may be driven safely along a desired reverse path in all visibility conditions.

In accordance with the aforesaid objects, the present invention provides a method for a streamlined, accelerated power push back of an aircraft, particularly an aircraft equipped with a pilot-controlled engines-off taxi system that drives the aircraft on a ground surface without reliance on the aircraft's main engines or on tugs or tow vehicles. The present power push back method is designed to be used to quickly and efficiently move an aircraft out of a gate where it is parked. The aircraft is driven the in reverse in essentially a straight line back from the terminal, along a path that is perpendicular to the gate, for an optimum distance selected to ensure that there is sufficient space for the aircraft to turn without obstruction. The aircraft is then stopped and turned, using the engines-off taxi system, to a position from which the pilot can control the engines-off taxi system to drive the aircraft in a forward direction to a runway for takeoff. Pilot reliance on ground personnel may be minimized by providing a monitoring system designed to monitor the aircraft's external environment and to provide feedback to the pilot during turning and other push back maneuvers. A preferred monitoring system is designed to monitor gate and ramp areas around the aircraft in any visibility conditions. The present accelerated power push back method may also be used to push back an aircraft parked in an angled, non-perpendicular orientation with respect to a gate or terminal that facilitates connection of passenger boarding bridges to rear aircraft doors without extending the loading bridges over a wing. The pilot-controlled engines-off taxi system is operated to turn the aircraft from its parked non-perpendicular orientation to a nose-in perpendicular orientation and reversed as described.

Other objects and advantages will be apparent from the following description, drawings, and claims.

DETAILED DESCRIPTION OF THE INVENTION

Figure 1A:
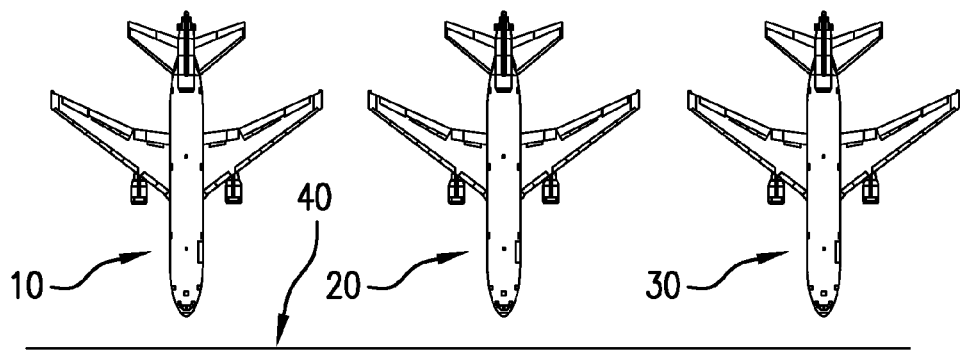
FIGS. 1a-1e illustrate the steps of the accelerated power push back method of the present invention when one of three aircraft parked in a nose-in orientation perpendicular to an airport terminal has been cleared for departure.
Figure 1B:
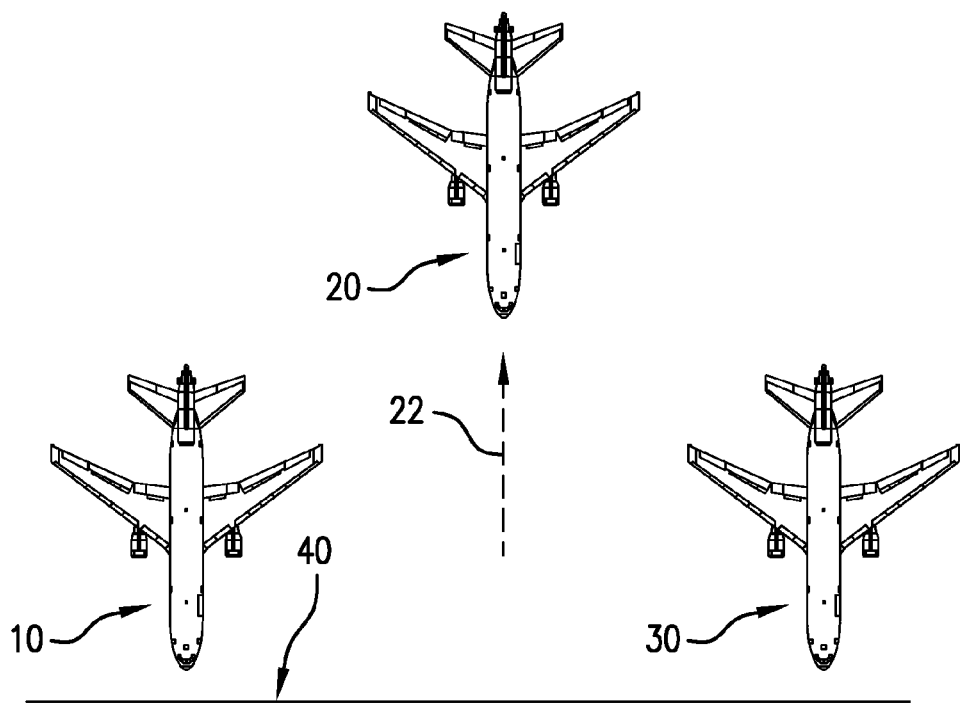

Maximizing the efficiency of aircraft turnaround to reduce the time an aircraft spends on the ground continues to receive attention from airlines and airports in an effort to increase revenues in an era of ever-increasing operating costs. While specific estimates vary, it is generally agreed that even a minute saved during aircraft turnaround may produce substantial annual cost savings. Consequently, modifications to gate structures and turnaround procedures that achieve turnaround reductions are of great interest to airport and airline operators.

In the most commonly used aircraft turnaround process, an aircraft is towed or powered by thrust from its main engine into a gate or other parking location to park in a nose-in or perpendicular orientation with respect to the gate or terminal. One or more, most commonly only one, passenger loading bridges are connected with aircraft doors, arriving passengers and baggage exit the aircraft, the aircraft is serviced, departing passengers and baggage board the aircraft, and loading bridges are moved back into place. When an aircraft is cleared for push back, a tug is attached to the aircraft nose landing gear, and the tug pushes the aircraft away from the gate or terminal as the aircraft is being turned to a location where the aircraft is parallel to the terminal. The tug is detached from the aircraft and, if the aircraft main engines have not already been started, they are started so that thrust from the engines may be used to drive the aircraft in a forward direction to a takeoff runway. Aircraft are oriented parallel to the terminal at this location to avoid jet blast from the operating engines hitting the terminal. Further, if aircraft are pushed back only partially and not into this parallel orientation by a tug, undesirable side loads are produced on the aircraft nose landing gear by the tug.

The present invention provides a method for a streamlined, accelerated power push back that may be used effectively and efficiently to minimize turnaround time with no changes to gates at airports and may be used with a range of aircraft types, including both narrow body and wide body aircraft. The present push back method quickly and efficiently moves an aircraft in reverse from a nose-in parked location at a terminal to a location outside an obstructed apron area and then turns the aircraft so the pilot can drive it to a takeoff runway. This streamlined method potentially saves at least one additional minute per push back compared with the push back of aircraft that are equipped with engines-off taxi systems and travel in reverse along a traditional push back path where the aircraft turns as it moves in reverse. Compared with current push back procedures using tugs with or without tow bars, the streamlined push back method of the present invention saves at least 3-5 minutes of turn-around time.

The present accelerated powered push back method is designed to be used to push back aircraft that are equipped with engines-off taxi systems. In a preferred engines-off taxi system, one or more non-engine drive means are mounted on one or more nose or main landing gear wheels to drive the wheels at a desired speed and torque. A most preferred engines-off taxi system has an electric drive means that is mounted to drive each wheel in an aircraft nose landing gear and is powered by the aircraft auxiliary power unit. A high phase order electric motor of the type described in, for example, U.S. Pat. Nos. 6,657,334; 6,838,791; 7,116,019; and 7,469,858, all of which are owned in common with the present invention, is preferred for this purpose. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference. Any form of motor capable of driving an aircraft on the ground, including hydraulic pump/motor assemblies, and pneumatic motors, is also contemplated for use as a drive means in an engines-off taxi system in accordance with the present invention.

The present accelerated power push back method is described with reference to the drawings, which are not necessarily drawn to scale. FIGS. 1a-1e show the consecutive steps of the method. Referring to the drawings, FIG. 1a illustrates three aircraft 10, 20, and 30, parked at an airport terminal 40 in a typical nose-in orientation perpendicular to the terminal 40. When aircraft 20 has been cleared for push back, a pilot of aircraft 20 controls the aircraft's engines-off taxi system to drive the aircraft in a reverse direction straight back from the terminal 40 along the perpendicular path 22 shown in FIG. 1b.

Figure 1C:
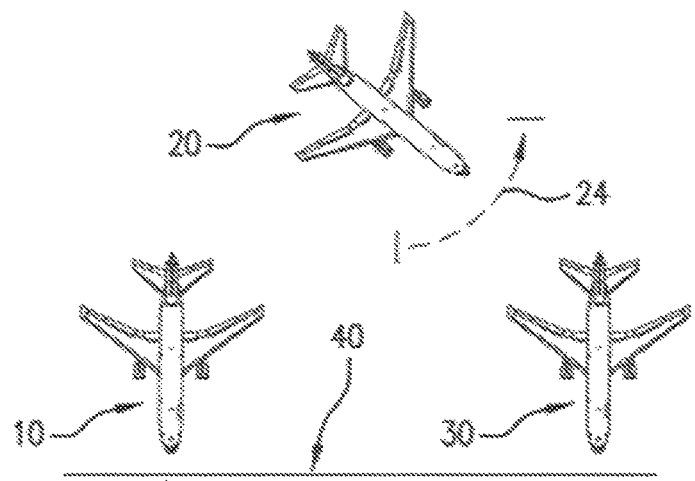

The pilot drives the aircraft in a reverse direction along this path to a location that is sufficiently far away from the gate and outside the most congested apron area closest to the terminal so that there is space for the aircraft to be safely turned, as shown in FIG. 1c, without obstruction. The distance the aircraft is driven in reverse before it is turned is preferably selected to allow the aircraft to move beyond congested gate and apron areas so that other aircraft, ground vehicles, and the like are not likely to be present in the outer ramp area where the aircraft will be turning. This distance may vary, depending on a specific airport or even a specific gate or apron area. It may be necessary for an aircraft to reverse for about 40 to 50 meters to avoid encountering obstructions or to avoid entering an adjacent gate area. At another airport, the distance traveled in reverse before a safe turn may be made safely may be about 15 to 20 meters.

In FIG. 1c, aircraft 20 has reached a location where it is safe to turn, and the pilot stops the aircraft and controls the engines-off taxi system to turn the aircraft in the direction of the arrow 24. The turn that is required when the pilot maneuvers the aircraft from the reverse orientation shown in FIG. 1b to an orientation (FIGS. 1d and 1e) in which the pilot can drive forward may be sharp. However, airport terminals currently have the space required for an aircraft rotation like this in uncongested apron or ramp areas. As a result, no airport modifications are required to implement this embodiment of the present accelerated power push back method.

Figure 1D:
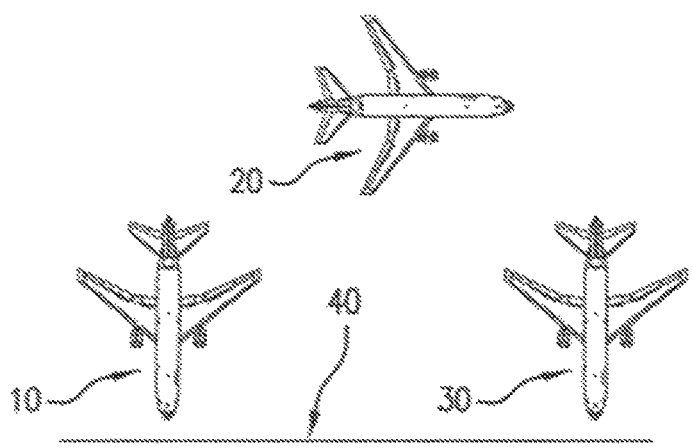

FIG. 1d illustrates aircraft 20 after it has stopped and then turned. The aircraft 20 shown in FIG. 1d has turned about 90° from the perpendicular so that it is parallel to the terminal 40. When the aircraft has reached this position, the pilot controls the engines-off taxi system to drive the aircraft forward, such as in the direction of arrow 26 shown in FIG. 1e, to a taxiway for takeoff. The aircraft may also be turned through other angles and in other directions than that shown in FIG. 1d. For example, the aircraft may be turned about 180° so that the nose end of the aircraft is directed away from the terminal, and the aircraft may drive forward. The aircraft may, alternatively, be turned about 270° so that the aircraft is parallel to the terminal, but the nose end will be pointed in an opposite direction from that shown in FIG. 1d.

To summarize the foregoing accelerated power push back steps: after receiving clearance for departure and push back, the pilot uses the engines-off taxi system to drive the aircraft in reverse from the terminal and then stops in an uncongested apron area where the pilot may turn the aircraft in a direction relative to the terminal through an angle ranging from about 90° to about 270°, and may then drive the aircraft in a forward direction to a takeoff runway. Reversing or backing up the aircraft to a turning location as described has been demonstrated to take about 20 seconds, and the complete maneuver shown in FIGS. 1a-1e may take no longer than about 45-60 seconds. The present streamlined, accelerated power push back method may be used to push back any type of aircraft equipped with an engines-off taxi system as described herein within this time frame. With the present method, because aircraft are capable of making sharp turns and there is no jet blast risk to the terminal, ground vehicles or other aircraft, the distance an aircraft must reverse before turning may be shorter than required for current aircraft push back procedures.

When an aircraft equipped with an engines-off taxi system is being turned as shown in FIG. 1c, a pilot may not have a clear view of the turning area or the environment surrounding the aircraft, and many pilots may not be comfortable relying entirely on ground personnel guidance for this type of maneuver in this environment. Although ground personnel, such as wing walkers, may be helpful in guiding an aircraft during conventional tug push back, they may lack experience guiding aircraft driven by engines-off taxi systems. To assist a pilot operating an aircraft with an engines-off taxi system to turn from the position shown in FIG. 1b to the position shown in FIG. 1d, an airport marking or a monitoring system may be provided.

Figure 1E:
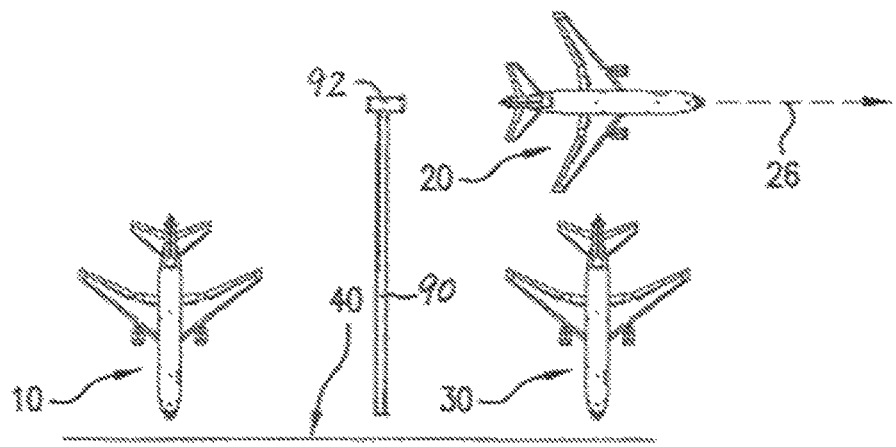

A preferred airport marking system, such as that shown in FIG. 1E, may have markings on the tarmac to define an optimum turn pattern that is visible to a pilot and to ground personnel and is designed to assist the pilot and ground personnel to maneuver the aircraft safely a selected distance from the gate area, such as the distance from the terminal 40 represented by path 90, to a turn location 92 where the aircraft may turn safely as described and shown herein. A preferred monitoring system should be able to monitor or survey the aircraft's external ground level environment and communicate information about ground level environment conditions that may impact the safety of the aircraft, so that that movement of the aircraft must be stopped. Aircraft movement may be resumed when a monitoring system indicates such movement will not impact the safety of the aircraft. A preferred monitoring system should, in addition, be capable of obtaining and communicating such information in any visibility or environmental conditions.

The use of cameras located in positions on the exterior of an aircraft where a complete view of the ground level environment all around the aircraft may be obtained may be one element in a suitable monitoring system. However, at night or in low visibility conditions, standard cameras are of limited value. A preferred monitoring system may also include a lidar and/or radar system, such as those currently provided for automobiles, for enhanced environmental monitoring that is capable of checking for obstructions in the aircraft travel or turning path. For example, when the engines-off taxi system is preparing for reverse movement or is directed to drive the aircraft in reverse, "bursting" by a radar system could check for potential obstructions not necessarily visible to a camera under the conditions. Feedback to the pilot from this type of system may be provided in the form of sounds, lights, or other suitable indicators.

Various kinds of other sensors may also be employed to provide information about potential hazards in an aircraft's external environment. In the event that a sensor senses an object or the like too close to the aircraft, that information would be communicated to the monitoring system, which may be designed to interact with the aircraft engines-off taxi system to prevent the taxi system from moving the aircraft. If the aircraft is already moving when the sensor senses a potential collision, the monitoring system may be designed to stop the engines-off taxi system, apply the aircraft's brakes, or take whatever action is needed to stop the aircraft from moving. The foregoing examples are merely illustrative, and it is contemplated that other variations of monitoring systems that may used to monitor an aircraft's exterior ground environment and provide information and feedback to a pilot of the aircraft to facilitate control of aircraft ground movement are contemplated to be within the scope of the present invention.

The accelerated power push back method of the present invention may also be used to push back an aircraft parked in a non-perpendicular parking orientation as described in commonly owned co-pending application Ser. No. 14/329,498, filed 11 Jul. 2014, entitled Improved Aircraft Gate Parking and Servicing Method, the disclosure of which is fully incorporated herein by reference. The method described in the co-pending application may be used effectively to park a narrow body aircraft in an optimum orientation that maximizes passenger access to aircraft doors rear of the aircraft wing. This optimum parking orientation is an aircraft parking orientation relative to an airport terminal and/or gate and loading bridge locations that positions an aircraft in a location and at an angle where maximum use may be made of the aircraft's doors, especially the aircraft's doors that are located behind or rear of the wing, and where loading bridges may be quickly and efficiently moved around and behind the wing to align with and connect to doors rear of the wing without having to be moved over the wing. Aircraft parked in this optimum orientation must be turned to a traditional nose-in orientation for push back, and the tight clearances and ground congestion in an aircraft gate area make these maneuvers challenging.

Figure 2C:
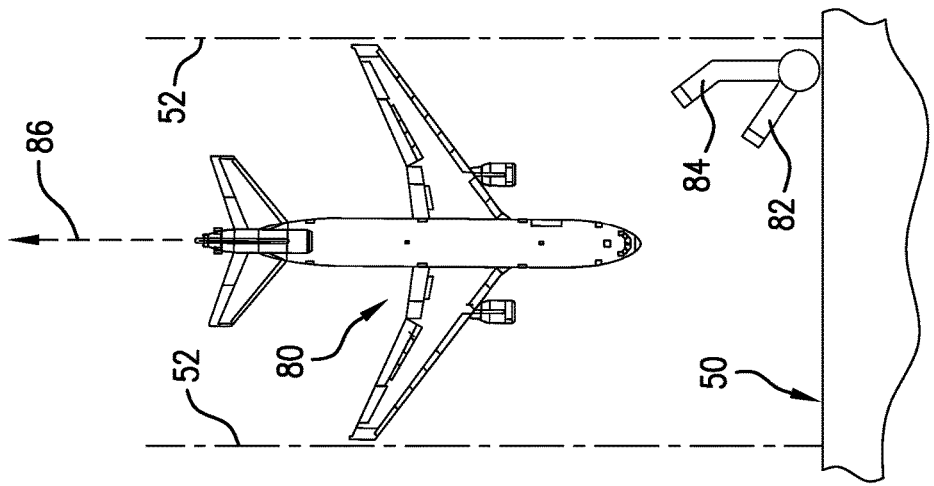
FIGS. 2a-2c illustrate the steps of an alternate use of the accelerated power push back method of the present invention for a single aircraft parked at an airport terminal in a novel, non-perpendicular orientation with dual passenger loading bridges connected to front and rear aircraft doors.
Figure 2B:
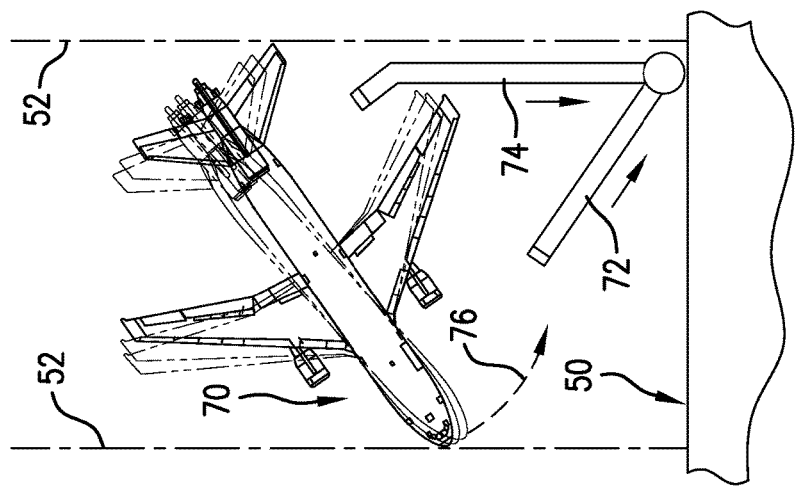
Figure 2A:
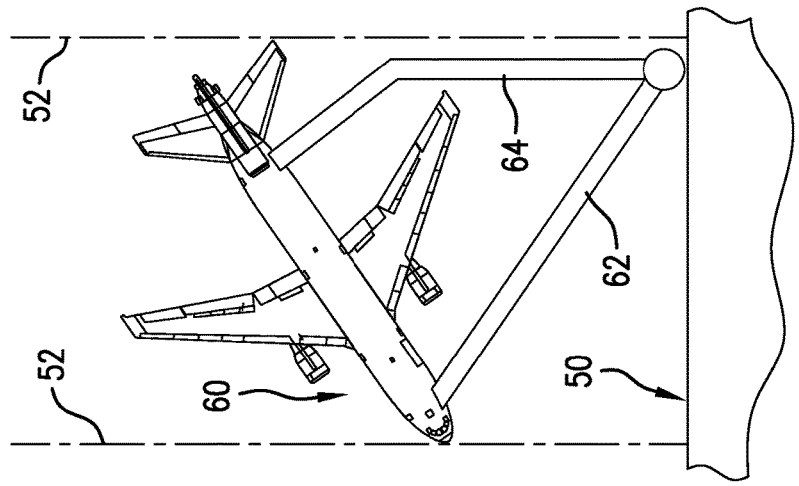

FIGS. 2a-2c show three gates at an airport terminal 50 with three typical narrow body aircraft 60, 70, and 80 parked at the terminal 50. Aircraft 60 is parked in an optimum parking orientation for passenger transfer. The width of the gates easily accommodates narrow body aircraft such as Boeing 737 and Airbus 320 aircraft and provides, in addition, a safety margin between gates, identified by lines 52. Required clearances between aircraft are maintained when aircraft are parked and turned as shown with the aircraft's engines-off taxi system. FIG. 2a shows aircraft 60 parked in this optimum orientation with passenger loading bridges 62 and 64 extended from the terminal 50 and connected to front and rear doors of the aircraft 50. The angle of the aircraft in the optimum parking orientation, which is about 45° past the perpendicular when the aircraft is in a nose-in position, permits connection of passenger loading bridges to aircraft doors rear of an aircraft wing without the need for an over-the-wing type of loading bridge. In the aircraft orientation of FIG. 2a, passenger deplaning and boarding occur through the loading bridges 62 and 64, and the aircraft is serviced as required prior to departure.

FIG. 2b shows aircraft 70 after it has been cleared for departure. The loading bridges 72 and 74 are being retracted away from the aircraft toward the terminal in the general direction of arrows. The aircraft 70 is being turned in the direction of arrow 76 by the pilot using the aircraft's engines-off taxi system. The phantom lines in FIG. 2b show the relative positions of the aircraft nose and tail as the aircraft 70 is turned toward the location of the loading bridges.

FIG. 2c illustrates the position of the aircraft 80 after it has been turned by the pilot using the engines-off taxi system from its angled parking location to a nose-in orientation perpendicular to the terminal 50. The loading bridges 82 and 84 are shown fully retracted close to the terminal. When the aircraft is in this orientation, the pilot controls the engines-off taxi system to drive the aircraft in a reverse direction along a path that is perpendicular to the terminal 50, as represented by dashed line 86, to a location that is sufficiently far away from the gate so that there is space for the aircraft to be turned, as shown in FIG. 1c. Whether an aircraft is parked in a nose-in orientation, as shown in FIG. 1a, or whether an aircraft is parked in another orientation, such as that shown in FIG. 2a and must be turned to a nose-in orientation, for example, aircraft 80 in FIG. 2c, the steps of the present accelerated power push back method are the same.

Other advantages may be realized with the present method. The amount of time during push back when an aircraft is at risk for ground incidents, for example collisions with ground vehicles or other aircraft, is limited when a pilot pushes an aircraft back with an engines-off taxi system as described herein since the aircraft is driven in reverse along a straight path without turning until the aircraft has moved beyond gate congestion. In the event that the engines-off taxi system has a limited running time, the present accelerated push back method may provide more time for pilots to complete checklists and the like before the engines-off taxi system stops operation. Moreover, when the aircraft begins to move forward after turning following reverse movement as described, less break-away torque is required to start the forward movement. Loads and a usage profile of the taxi system may also be improved when the ground surface over which the aircraft travels has a slope.

While the present invention has been described with respect to preferred embodiments, this is not intended to be limiting, and other arrangements and structures that perform the required functions are contemplated to be within the scope of the present invention.

INDUSTRIAL APPLICABILITY

The method for accelerated power push back of the present invention will find its primary use in pushing back aircraft equipped with engines-off taxi systems controllable by an aircraft pilot to reverse the aircraft quickly and easily out of a gate, turn, and drive forward for takeoff when it is desired to achieve accelerated safe and efficient push back and reduce aircraft turnaround time.

The invention claimed is:

1. A time saving method for accelerated powered self push back of an aircraft equipped with an engines-off taxi system that moves the aircraft efficiently during push back from an airport terminal gate parking location to a location where the aircraft is turned safely and driven forward to taxi to takeoff, comprising:

a. equipping an aircraft with a pilot-controlled engines-off taxi system comprising at least nose or main landing gear wheel-mounted drive motors for autonomous ground movement of the aircraft without operation of aircraft engines and connection to external tow vehicles, and driving the aircraft with the pilot-controlled engines-off taxi system to an airport terminal gate equipped with dual passenger loading bridges connected to the terminal through a single terminal connection;

b. parking the aircraft at the airport terminal gate at an angle with the nose of the aircraft oriented clockwise past perpendicular relative to the airport terminal completely within a width of the airport terminal gate, and simultaneously connecting one of the dual passenger loading bridges to a front door on a terminal facing side of the aircraft and the other of the dual passenger loading bridges to a door of the aircraft rear of an aircraft wing on the terminal-facing side of the aircraft without extending the other of the dual passenger loading bridges over the aircraft wing;

c. at departure and push back, controlling the pilot-controlled engines-off taxi system by the pilot, turning the aircraft nose in a counterclockwise direction to a nose-in perpendicular orientation completely within the airport terminal gate width, and then driving the aircraft with the pilot-controlled engines-off taxi system in a reverse direction along a defined path perpendicular to the terminal to a safe turning location a distance away from the terminal;

d. turning the aircraft with the pilot-controlled engines-off taxi system in a desired direction relative to the terminal through a turning angle ranging from 90° to 270° relative to the defined path perpendicular to the terminal so that the aircraft is oriented either parallel or perpendicular to the terminal; and e. driving the aircraft in a forward direction with the pilot-controlled engines-off taxi system from the safe turning location to a takeoff location.

2. The method of claim 1, further comprising equipped a narrow body aircraft or a wide body aircraft with the pilot-controlled engines-off taxi systems, parking and turning the narrow body aircraft or the wide body aircraft completely within the terminal gate width and driving the narrow body aircraft or the wide body aircraft along the defined path perpendicular to the terminal to the safe turning location.

3. The method of claim 1, further comprising providing a marker system comprising markings on an airport tarmac surface between the terminal gate and the safe turning location defining the defined path perpendicular to the terminal and the safe turning location visible to the pilot controlling the engines-off taxi system and to ground personnel as the aircraft is driven in reverse along the defined perpendicular path from the terminal gate to the safe turning location.

4. The method of claim 1, further comprising selecting the safe turning location and the distance away from, the terminal along the defined path perpendicular to the terminal in an airport apron area free from ground vehicle and aircraft congestion, wherein the distance away from the terminal comprises from 15 to 50 meters.

5. The method of claim 1, further comprising providing a monitoring system on the aircraft positioned to obtain information about potential hazards in a ground level environment of the aircraft at night and in low visibility conditions as the aircraft is driven with the pilot-controlled engines-off taxi system in reverse on the defined path perpendicular to the terminal to the safe turning location, turned in the desired direction through the turning angle and driven forward to the takeoff location, obtaining the information from the monitoring system, communicating the obtained information about the aircraft ground level environment to the pilot of the aircraft or to ground personnel in the vicinity of the aircraft, and continuing to drive the aircraft with the engines-off taxi system in reverse, to turn the aircraft, and to move the aircraft forward, or stopping operation of the engines-off taxi system and movement of the aircraft based on the obtained and communicated ground level environment information.

6. The method of claim 5, further comprising providing the monitoring system with cameras, radar, and lidar and controlling operation of the engines-off taxi system to move the aircraft in response to information obtained from the cameras, radar, and lidar.

7. A method for improving safety of push back and reducing time for push back from an airport terminal parking location of a parked aircraft powered by an engines-off taxi system for pilot-controlled powered ground movement independently of the operation of aircraft engines and external tow vehicles that streamlines powered push back and minimizes use of ground personnel, comprising:

a. equipping aircraft moving into and out of parking locations at an airport terminal with engines-off taxi systems comprising at least electric drive motors mounted in one or more nose or main landing gear wheels controllable during taxi by a pilot of the aircraft to drive the aircraft independently without aircraft engines and without tow vehicles to an airport terminal gate and with a push back monitoring systems comprising at least cameras, radar, and sensors positioned in exterior locations on the aircraft operable to continuously survey and obtain information about potential hazards in a ground level environment exterior to the aircraft;

b. providing a tarmac surface marking system visible to the pilot and airport ground personnel as the aircraft are moved with the engines-off taxi system along a perpendicular push back path corresponding to a line extending perpendicular to the airport terminal from an aircraft parking location adjacent to the airport terminal to a safe turning location a distance away from the airport terminal in an area free from ground vehicle and aircraft congestion, wherein the tarmac surface marking system defines and marks the entire perpendicular push back path and defines and marks the safe turning location the distance along the defined and marked perpendicular push back path away from the airport terminal;

c. at push back, driving an equipped aircraft with the engines-off taxi system by the pilot in reverse from the aircraft parking location along the defined and marked perpendicular push back path, and using the monitoring system to simultaneously and continuously survey the aircraft exterior and the ground level environment to obtain the information about potential hazards as the aircraft is driven in reverse along the defined and marked perpendicular push back path the distance to the safe turning location;

d. in the absence of potential hazards, continuing to drive the aircraft with the engines-off taxi system in reverse along the defined and marked perpendicular push back path the distance to the defined and marked safe turning location, and when the monitoring system indicates presence of a potential hazard to continued reverse travel of the aircraft along the defined and marked push back path, stopping reverse travel until the potential hazard is no longer present; and e. at the defined and marked safe turning location, turning the aircraft with the pilot-controlled engines-off taxi system in a desired direction relative to the airport terminal through a turning angle ranging from 90° to 270° relative to the defined and marked perpendicular push back, path to an aircraft orientation parallel or perpendicular to the airport terminal, and driving the turned aircraft in a forward direction with the engines-off taxi system from the safe turning location to a takeoff location.

8. The method of claim 7, further comprising selecting and marking the defined safe turning location at a distance away from the terminal along the defined and marked perpendicular push back path comprising from 15 to 50 meters away from the terminal.

\* \* \* \* \*